INVENTOR.
GEORGE McARTHUR, JR.
BY ANTHONY J. SCHWARTZ

Jerome R. Cox
ATTORNEY

United States Patent Office 3,504,660
Patented Apr. 7, 1970

3,504,660
OVEN CONTROL
George McArthur, Jr., Delaware, and Anthony J. Schwartz, Worthington, Ohio, assignors to Glenwood Range Company, Taunton, Mass., a corporation of Massachusetts
Continuation-in-part of application Ser. No. 680,368, Nov. 3, 1967. This application Nov. 25, 1968, Ser. No. 778,691
Int. Cl. A21b 1/00; F24c 15/32
U.S. Cl. 126—21                                                        38 Claims

ABSTRACT OF THE DISCLOSURE

Apparatus and method are disclosed for warming up an oven by initially supplying heat at a low rate and, after the oven is warm enough to permit a sufficient draft through the oven vent, supplying heat at a high rate at least partly from a gas burner. The heat is initially supplied either from an electric heater or a gas burner, and subsequently is supplied from both the initial source of heat and a gas burner.

CROSS REFERENCE TO RELATED APPLICATION

This application is a continuation-in-part of our copending application Ser. No. 680,368 filed Nov. 3, 1967, and now abandoned. Reference is also made to the copending applications of George McArthur, Jr. Ser. No. 648,839, filed June 26, 1967, Ser. No. 585,596, and now Patent No. 3,465,125 and Ser. No. 770,598, filed Oct. 25, 1968.

BACKGROUND

Our invention relates to cooking ovens, and more particularly relates to the proper warm-up control of an oven.

In preparing a cooking oven for cooking or for heat cleaning, the first step is to raise the oven temperature to a desired temperature. Conventionally, such warming up of the oven is accomplished by initially operating the oven heat supply means at its maximum heat supply rate until the desired temperature is reached. Subsequently, the heat supply means is cycled around (i.e. repeatedly raised slightly above and then dropped slightly below) the desired temperature by a temperature sensing control system.

Gas ovens must be provided with vents to permit the exit of burned fuel and cooking products from the oven. Such ovens require an air current which enters the stove, usually near its bottom, sweeps the gas burner, supporting combustion, and passes up through the oven and out a vent, removing the gaseous products of combustion and cooking. This necessary air current is provided by a suitable stack action set up through an adequate vent by the heating of the air in the oven.

For an oven with a vent of given size, the warmer the oven, the faster the draft through the oven; because a warmer oven is able to raise the air to a higher temperature.

When an oven, which has a heat supply means including a gas burner, is cold and it is necessary to warm it up for cooking purposes or for heat cleaning, initially (i.e. when the heat supply means is first turned on and the warm-up cycle begins) the rate of air current through the oven vent is relatively low. In fact, the rate of air current through the oven at such time is critical, and a fairly large size of vent is necessary in order to sustain combustion. The combustion rate during the conventional warm up is at its maximum in order to raise the temperature quickly to its desired point, and therefore the need for air to support combustion and the need for removing the products of combustion are at their maximum. However, the oven is at its lowest temperature and therefore the air current draft is at its minimum. It is therefore customary to design the oven vent so that it is large enough to permit a sufficient air current to flow through the oven when the heating means is initially turned on at its maximum heat supply rate. Of course, if so designed, the vent will be sufficiently large for all other oven operations.

The air current draft must be sufficient at all times to supply enough air through the oven to support complete combustion of the fuel and to exhaust the products of combustion so that they do not smother the flame. Unfortunately, a vent designed in the customary way will be too large for the oven after the oven is heated to cooking temperatures. The draft will, at that time, be greater than is necessary and desirable. This excess draft results in an unnecessary loss of heat carried out of the oven by the draft. Such loss at cooking temperatures up to 550° F. has not been considered great enough in the past to require corrective measures. This excess draft also unduly heats the kitchen during cooking, and especially during heat cleaning.

We have found that the loss becomes great enough at heat cleaning temperatures, which may be above 750° F., that a solution to the heat loss problem is now necessary in order to prevent the excess loss of heat.

In a copending application of George McArthur, Jr., Ser. No. 648,839, a suggested solution is to restrict or obstruct the vent (but normally not completely blocking the vent) by means of a movable closure while the oven is at the higher temperatures to reduce the air current through the oven to a minimum but sufficient draft. Such a solution requires not only a movable closure but also a control system to operate the closure when the oven temperature nears the cleaning temperature.

There is a need for a method and apparatus for warming an oven to a desired temperature, either for cooking or cleaning, with a fixed size vent having no movable closure and which does not waste heat. There is a need for such a warming up method and apparatus which does not require the operation of a vent closure after the warm-up begins and does not require an automatic closure control apparatus.

It is therefore an object of our invention to provide an improved oven control.

Another object of our invention is to provide a control and method which permit use of a small oven vent and provide a reduction of oven heat loss.

Another object of our invention is to eliminate any need for a control system and an electro-mechanical device to close an oven vent closure during oven warm-up.

Another object of our invention is to provide a safety improved warm-up technique and apparatus.

Further objects and features of our invention will be apparent from the following specification and claims when considered in connection with the accompanying drawings illustrating several embodiments of our invention.

SUMMARY

We have found that the foregoing and other objects may be attained with a warm-up method comprising the steps of: supplying heat into an oven from an oven heat supply means at a rate substantially below the maximum heat supply rate of the supply means at least until the oven is sufficiently warm to permit a draft through the oven vent adequate to maintain complete combustion of gas delivered to an oven gas burner at its maximum heat supply rate; and thereafter supplying heat into the oven at least partly from the gas burner operating at its maximum heat supply rate until the oven reaches the desired temperature.

These and other objects may be attained with a control for raising the temperature of an oven having a vent to a desired temperature, the control comprising: (a) means for supplying heat to an oven at a selected low rate; (b) means for supplying heat to an oven at a selected high rate substantially above the selected low rate; (c) means for actuating the low rate supplying means to supply heat to the oven at said low rate; and (d) means for actuating the high rate supplying means to supply heat to the oven at said high rate after the oven approximately reaches a selected temperature.

DESCRIPTION OF THE VIEWS

In describing the embodiments of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

DESCRIPTION OF THE PREFERRED EMBODIMENTS

Figure 1:
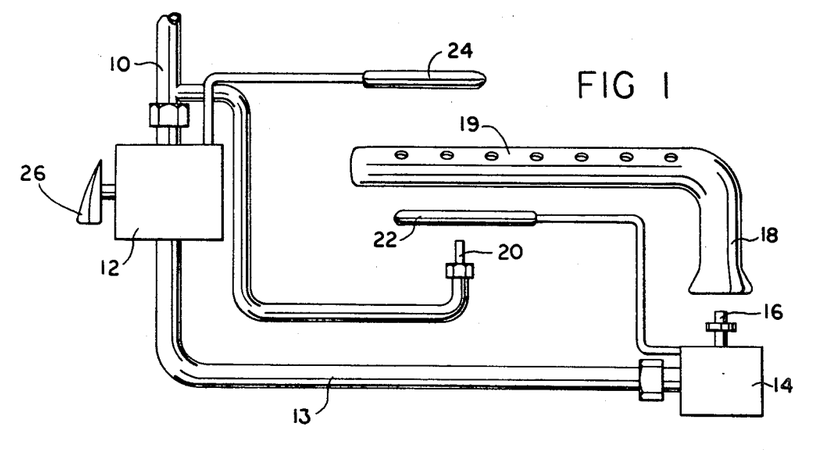
FIGURE 1 is a schematic view of a simple all-gas, single control valve embodiment of our invention.

In FIGURE 1, we show one of the most simple forms of a control system constructed according to our invention. A gas supply inlet 10 supplies fuel through a control valve 12, a conduit 13, and a safety valve 14 to a nozzle 16, a mixing bell 18, and a heat supply means such as a burner 19. A pilot nozzle 20 is connected to the inlet 10. A temperature sensing bulb 22 is hydraulically connected to the safety valve 14 for conventional safety purposes. A temperature sensing means, such as the hydraulic bulb 24, is connected to the control valve 12.

The control valve 12 has at least three positions: off, or pilot light only; a selected low rate of fuel passage; and a selected high rate of fuel passage. A control knob 26 permits presetting or positioning of the valve 12 from its off position to its low rate position. A hydraulic temperature sensing system, comprising the conventional bulb 24 co-operating with a diaphragm, positions the valve 12 for its high fuel delivery rate when the oven temperature is raised to a selected temperature provided that the valve 12 has been preset to its low rate position. Furthermore, this temperature sensing system determines and controls the desired ultimate oven temperature for cooking or cleaning by controlling the valve 12 in a conventional cycling manner.

The control shown in FIGURE 1 is used in an oven having an undersized vent; that is, having a vent which is not large enough to permit sufficient draft through an unwarmed oven if fuel is delivered to the burner 19 to operate the burner 19 at its maximum heat delivery rate.

To begin the warm-up of an oven provided with the system of FIGURE 1, the operator turns the control knob 26 to its position for low fuel delivery rate. If the temperature sensing bulb 22 senses that the pilot 20 is burning, so that the safety valve 14 is opened, the burner 19 will begin to supply heat into the cold oven at a selected low rate.

The undersized vent, although too small to permit a sufficient draft at the high heat supply rate, will permit a draft to flow which is sufficient at this low heat supply rate. The oven may safely begin to warm up.

When the bulb 24 senses that the oven temperature has reached a selected temperature, the valve 12 is automatically positioned, by the hydraulic temperature sensing system, for fuel delivery at its high rate causing a high rate of heat supply at the burner 19.

The selected temperature at which the high heat supply rate begins is the temperature at which the draft will be sufficient to maintain complete combustion of fuel delivered at the high heat supply rate.

Thus, the oven is warmed up, not in the conventional manner by supplying a maximum heat initially, but rather by supplying the heat at a rate substantially below the maximum rate at least until the oven is sufficiently warm to permit a draft adequate to maintain complete combustion and then supplying heat into the oven at the maximum heat supply rate until the oven reaches the desired cooking or cleaning temperature. Of course, "maximum" means the maximum rate at which the burner is operated and not the maximum rate at which it could be operated for other purposes.

Figure 2:
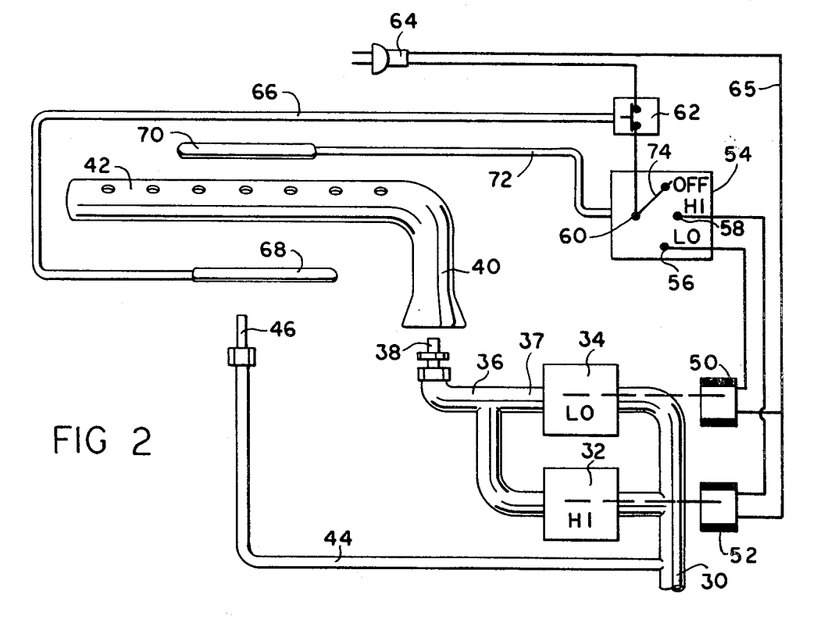
FIGURE 2 is a schematic view of a simple all-gas parallel control valve embodiment of our invention.

In FIGURE 2, we show another simple embodiment using parallel valves. Fuel is supplied through an inlet pipe 30 to a high rate control valve 32 and a low rate control valve 34. These valves 32 and 34 control the flow of fuel through a pipe 36 to a nozzle 38, and into a mixing bell 40 to a burner 42. When the high rate control valve 32 is opened, it permits fuel passage at a high delivery rate; and when closed, it permits no fuel passage. The low rate valve 34 similarly permits a low fuel delivery rate when open, and no fuel passage when closed.

Pilot fuel is delivered from the inlet pipe 30 through a pilot pipe 44 to a pilot nozzle 46.

The low rate valve 34 is operated by a solenoid 50, and the high rate valve is operated by a second solenoid 52. Both solenoids are connected to a rotary control switch 54. The first solenoid 50 is connected to a stationary terminal 56 of the rotary control switch 54, and the second solenoid is connected to another stationary terminal 58. The rotary terminal 60 is connected through a safety switch 62 to the power source connector 64.

The safety switch 62 is operated by a hydraulic temperature sensing system comprising a tube 66 connecting a diaphragm (not shown) to a bulb 68. When no pilot flame is present at the pilot nozzle 46, the safety switch 62 opens to prevent operation of the control valves 32 and 34.

The wiper 74 of the control switch 54 may be manually positioned at the first stationary terminal 56. When the oven temperature reaches a selected temperature, a hydraulic temperature sensing system, comprising a bulb 70 and a tube 72, positions the wiper at the second stationary terminal 58. This hydraulic temperature sensing system may also be used to control the desired ultimate oven temperature for cooking or cleaning.

To begin warm-up of an oven provided with the control shown in FIGURE 2, the operator positions the control switch 54 so that its wiper 74 contacts the "low" stationary terminal 56. If a pilot flame is present at the pilot nozzle 46, then the first solenoid 50 will operate the low rate control valve to permit fuel flow to the burner 42 at a low rate of delivery. Heat will be supplied at a low rate to begin warming up the oven.

When the bulb 70 senses that the oven has reached a selected temperature, the wiper 74 will be automatically positioned at the high stationary terminal 58. The low rate valve 34 is closed and the high rate valve 32 is opened by its solenoid 52. Heat will then be supplied at a high rate until a desired temperature is reached. The control switch 54 then cycles the burner 42 to maintain the desired temperature for cooking or cleaning.

The control of FIGURE 2 could be altered so that the low valve 34 remains on when the high valve 32 comes on. Furthermore, the flow reducing restrictions which determine flow rate could be anywhere in the fuel path which goes through one valve only, rather than in the valve itself; that is, valves 32 and 34 could be identical but a restriction can be located in the path through the low valve 39, for example at 37.

Figure 3:
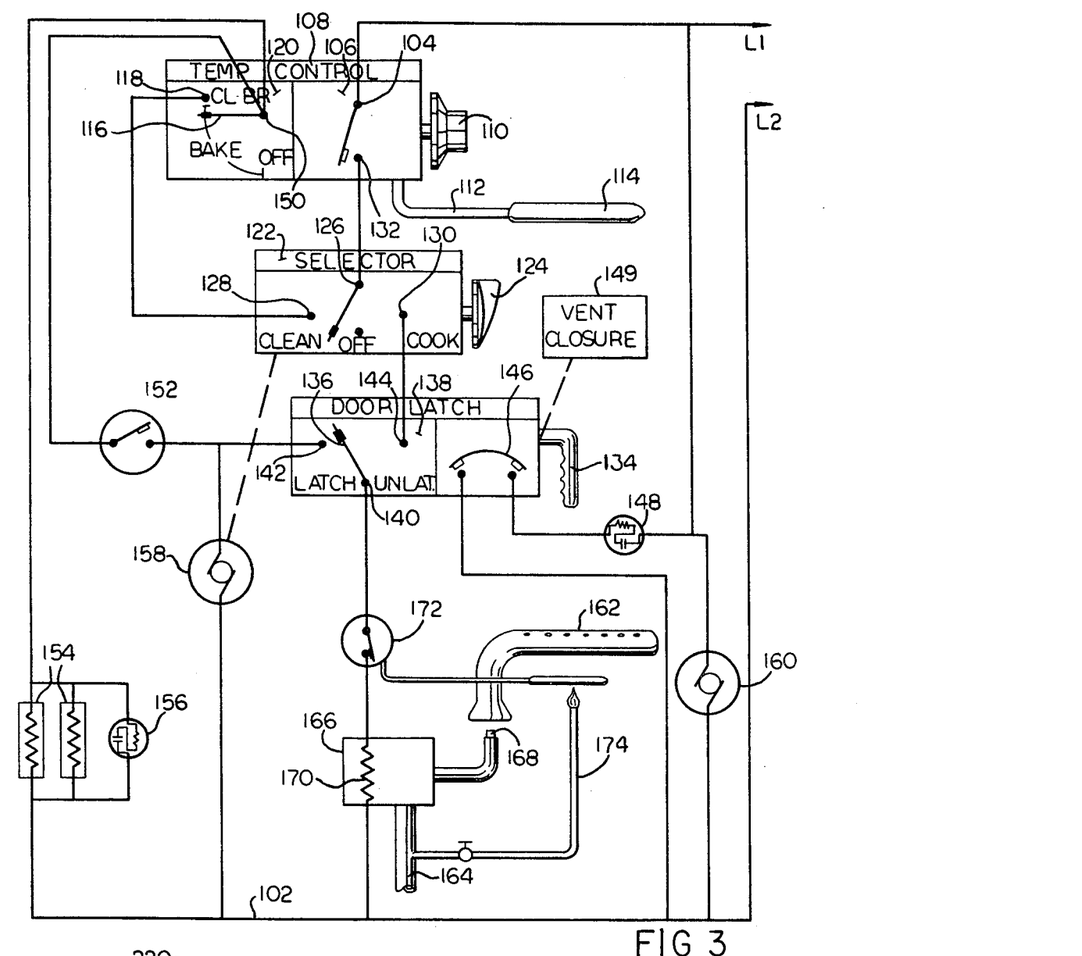
FIGURE 3 is a schematic view of an electric heat aided embodiment of our invention.

The electrically aided embodiment of our invention is shown in FIGURE 3. Electrical power is supplied into the circuit at a pair of power input terminals L1 and L2. One input terminal L2 is connected to a conductor 102 which is referred to as the ground 102. The other input terminal L1 is connected to a first terminal 104 of a thermostat cycling switch 106. The thermostat cycling switch is a part of the oven temperature control 108.

The temperature control 108 is manually adjustable, by means of an oven temperature control knob 110, to a desired oven bake temperature up to 550° F. and, at the high end of the temperature scale, to a position indicated on the control panel as "clean-broil."

At any bake temperature up to 550° F., the temperature control 108 provides conventional oven thermostat control of the baking temperature. It senses oven temperature by means of a hydraulic tube 112 and bulb 114. However, when the temperature control knob 110 is positioned at "clean-broil," a circuit is made through a thermostat function switch 120 between ist first terminal 118 and its second terminal 150.

The control shown in FIGURE 3 is also provided with a function selector switch 122 controllable by a selector knob 124. The selector switch comprises an input terminal 126 and two output terminals 128 and 130, one (128) for the clean function and the other (130) for the cook function.

The second terminal 132 of the thermostat cycling switch 106 is connected to the input terminal 126 of the selector switch 122. The clean terminal 128 of the selector switch 122 is connected to a first "clean-broil" terminal 118 of the temperature control 108.

The oven door is provided with a latch (not shown) by which the oven door may be latched closed during oven cleaning. The latch is provided with a latch handle 134 which is mechanically connected for operation of the wiper 136 of a latch control switch 138. When the handle 134 is positioned to latch the oven door, a circuit is made between the wiper terminal 140 and a latch terminal 142. Similarly, when the handle 134 is in the unlatch position, a circuit is made between the wiper terminal 140 and an unlatch terminal 144.

The door latch is provided with a temperature sensitive locking mechanism (not shown) which locks the oven door, so that it cannot be unlatched by the handle 134, when the oven temperature rises above a safe limit. Connected to the lock is a door lock indicating switch 146 which closes to illuminate a "locked" indicating light 148 mounted on the stove control panel.

An oven using the control of FIGURE 3 is provided with a vent and is preferably provided, as shown in FIGURE 3, with a movable closure 149 similar to that shown in the above referred to copending application Ser. No. 648,839. The closure is mechanically linked to the handle 134 so that the closure provides a partial obstruction of the vent when the handle is moved to the latch position. It will become obvious that the closure is optional and that the oven can be provided with a fixed, undersized vent. Thus, the oven has an undersized vent either because of the movement of a vent closure or because the vent was permanently constructed as undersized.

The purpose of using a vent with a closure to make it temporarily undersized rather than using a permanently undersized vent is to permit a more rapid warm-up for cooking purposes. Use of our method for warm-up may under certain conditions increase the warm-up time. For example, while conventional warm-up of our oven for cooking with the vent open might occur in less than ten minutes, warm up for cooking with the vent temporarily undersized may take fifteen minutes.

Connected between the latch terminal 142 and the second terminal 150 of the thermostat function switch 120 is a line in which is positioned a selected temperature responsive switch 152. This switch 152 makes contact at a selected temperature. For example, a mercury switch mounted on a bimetallic strip which makes contact at approximately 225° F. can be used.

Electric heaters 154 are connected between the ground 102 and the second terminal 150 of the thermostat function switch 120. A "clean" indicating light 156 is electrically connected across the heaters 154 and mounted on the stove control panel. We prefer that the electric heaters be of a type which are fixed to the exterior of the oven liner in good thermal contact therewith, as for example as is shown in the patent of George McArthur, Jr., No. 3,465,125.

The circuit of FIGURE 3 is further provided with a "clean" period timing means 158 which is electrically connected between the ground 102 and the latch terminal 142. We prefer to use an electric motor functioning as a clock. Its rotating shaft is suitably geared down to an appropriate speed and connected to a cam (not shown). This cam co-operates with a cam follower (not shown) which is mechanically linked to the wiper of the selector 122. After the elapse of a selected time period following energization of the timing means 158, the cam will remove the wiper of the selector 122 from contact with the "clean" terminal 128 and thereby halt the cleaning function.

A conventional stove clock and cooking timer 160 is shown connected between the power input terminals L1 and L2.

The oven is also provided with a gas burner 162 so that the oven heat supplying means comprises the combination of electric heaters 154 and a gas burner 162. A gas inlet conduit 164 supplies gas through an electro-mechanically operated control valve 166 to a nozzle 168.

An electro-mechanical valve actuation means 170 is serially connected from the ground 102 to a conventional pilot safety flame switch 172 and the wiper terminal 140 of the latch control switch 138. We prefer that this valve actuation means 170 be of the type comprising a plug or diaphragm seated to block a gas passage in the valve 166 and mechanically connected to a bimetallic strip which is heated by an electric current through a thermally connected resistance. With no current, the plug or diaphragm prevents gas flow. With electrical current, the bimetallic strip bends to removed the plug or diaphragm from the passage, permitting gas flow.

Figure 4:
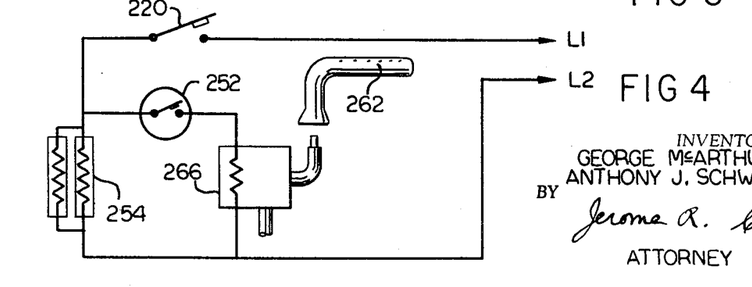
FIGURE 4 is a schematic view of the basic elements of an electric heat aided embodiment of our invention.

The operation of the control shown in FIGURE 3 may best be understood by first considering the operation of its basic elements which are shown in FIGURE 4. The electric heater 254 may be initially energized by closure of the actuating means 220 thereby connecting the electric heater 254 to the power input terminals L1 and L2. The electric heater 254 begins to deliver heat at a rate well below the maximum heat supply rate of the oven heat supply means. For an electric heater alone, no air current is needed so that the oven vent may be quite small. When the oven reaches a selected temperature, the temperature sensing means 252 actuates the valve 266 to begin fuel flow to the gas burner 262. With both the gas burner 262 and the electric heater 254 operating, the oven heat supply means is supplying heat at a high rate which is the maximum heat supply rate of the heat supply means. Additional structure must be provided to stop this high heat supply rate, either when a desired cooking temperature is reached or when a suitable length of time for heat cleaning has elapsed. Obviously, the electric heater could be deenergized after the gas heater comes on if its heat contribution is not needed.

Referring now to the operation of the oven control shown in FIGURE 3, the control is set for the cooking function by positioning the latch handle 134 to its unlatched position and by setting the selector 122 to its cook position. These positions provide a conducting path from the first power input terminal L1, through the thermostat cycling switch 106, through the selector switch terminals 126 and 130, and through the door latch control switch terminals 144 and 140, to the safety flame switch 172 and the valve actuation means 170, and ultimately to the ground 102.

In these positions, the oven functions in a conventional manner with the thermostat cycling switch 106 cycling around the temperature chosen by adjustment of the temperature control knob 119. The vent closure 149 would be opened because the latch handle 134 is in its unlatch position. Oven warm-up would be conventionally performed.

It would be obvious to modify the circuit of FIGURE 3 so that the cooking warm-up in addition to clean warm-up would be accomplished according to our invention. However, we do not prefer to do so.

Warming up the oven for heat cleaning purposes using the control shown in FIGURE 3 is done according to our method. The operator chooses the clean function by setting the selector 122 to the clean position so that the input terminal 126 is connected to the clean terminal 128. The temperature control knob 110 is turned all the way up to the "clean-broil" position so that the first terminal 118 of the thermostat function switch 120 is connected to its second terminal 150. Because the oven is cold, the thermostat cycling switch will be closed. This positioning causes energization of the electric heaters 154 which immediately begin to warm up the oven and cause illumination of the "clean" indicating light 156.

The door latch handle 134 is then positioned to latch the oven door. This closes the vent closure 149 to restrict or obstruct the vent and connects the wiper terminal 140 of the door latch control switch 138 to its latch terminal 142.

When the oven temperature reaches a selected temperature, such as 225° F., at which a sufficient draft can exist through the oven, the selected temperature responsive switch 152 closes. If the pilot safety flame switch 172 is closed, current flows through the electro-mechanical valve operating means 170 to cause opening of the control valve 166 and begin ignition at the burner 162.

Closing of the selected temperature responsive switch 152 also initiates operation of the clean period timing means 158. Oven temperature will rise toward the cleaning temperature range. When the temperature rises above a safe limit, the temperature sensitive door lock will lock the door and close the door lock indicating switch 146 to cause illumination of the "locked" indicating light 148.

The oven temperature will rise to and remain in the heat cleaning range until the timing means, through its cam and cam follower, breaks the circuit between the selector 122, input terminal 126, and its clean terminal 128. Obviously, the circuit could be broken at the other switches or in another equivalent manner.

When this circuit is broken, both the electric heaters 154 and the gas burner 162 cease to supply heat. When the temperature falls below a safe limit, the door unlocks and the operator may open it after moving the latch handle 134 to its unlatch position. The oven is then ready for normal cooking usage.

It should be noted that the thermostat cycling switch must not be opened below the cleaning temperature range by the hydraulic oven temperature sensing system. This can easily be assured by an obvious mechanical connection to prevent its opening when the control knob 110 is turned to the "clean-broil" position. However, we prefer to position the hydraulic bulb 114 in the oven vent in a manner fully described in the above referred to copending application Ser. No. 648,839.

Figure 5:
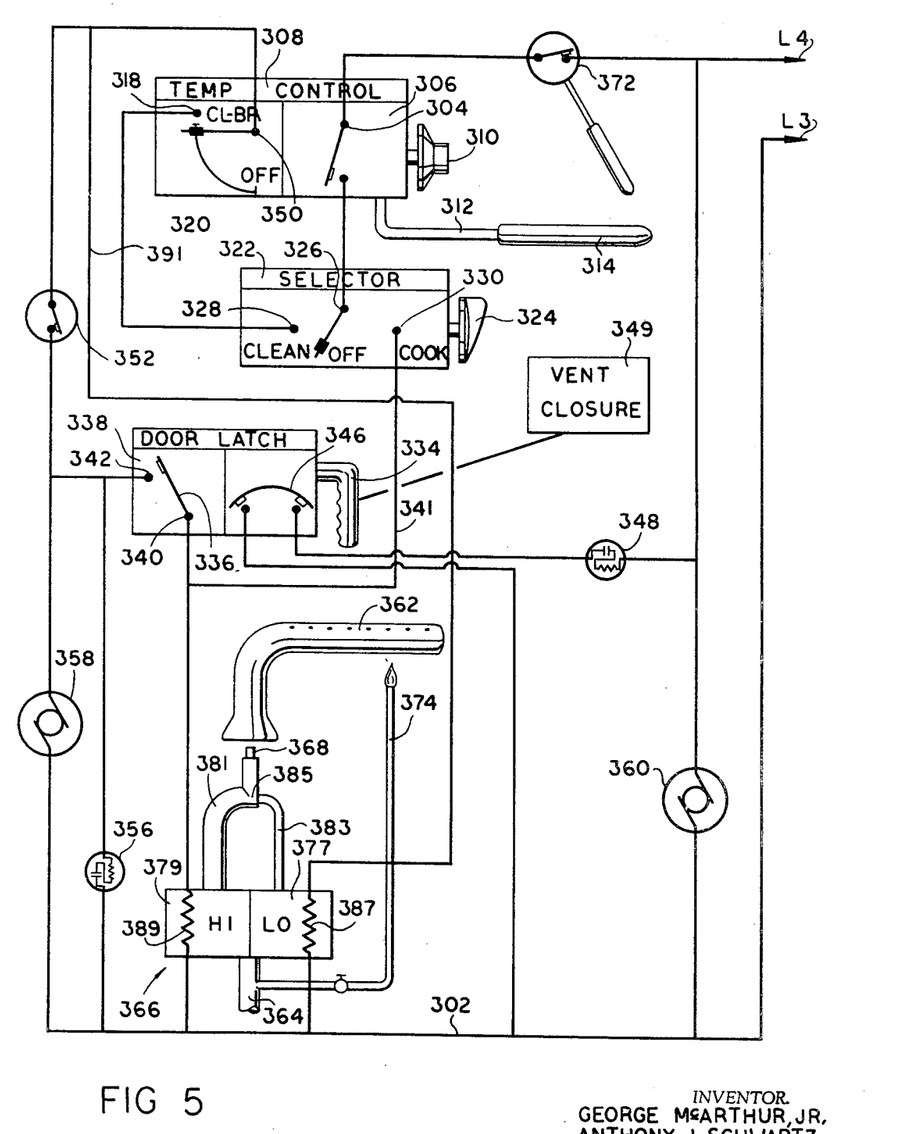
FIGURE 5 is a schematic view of an all-gas alternative embodiment of our invention.

The alternative embodiment shown in FIGURE 5 is in many ways similar to the embodiment shown in FIGURE 3. However, the embodiment of FIGURE 5 is completely gas heated. In FIGURE 5, the reference numerals generally correspond to the parts indicated in FIGURE 3 having the same last two digits. The conventional pilot safety flame switch 372 has been repositioned in the circuit. Unlike FIGURE 3, the latch control switch 338 is not provided with an unlatch terminal. Instead, the cook terminal 330 is connected directly to the wiper terminal 340 by a conductor 341. This is an alternative wiring, and an unlatch circuit like that of FIGURE 3 could be provided instead of the conductor 341. The result is that while cooking could be done with the door latched, a contact is eliminated from the door latch control switch 338.

The primary difference between the circuit of FIGURE 3 and that of FIGURE 5 lies in the control valve 366, its connection to the electrical circuit, and in the omission of electric heating units.

The control valve 366 is really two valves; that is, there are two outputs controlled separately. For example, a Stevens double valve type 16D400 may be used.

For use in our invention, actuation of one valve must permit fuel flow at a low rate while actuation of the other valve must permit flow at a high rate. In this embodiment, we use two identical valves—a low rate valve 377 and a high rate valve 379. Gas flows into these valves through an inlet conduit 364 and out through conduits 381 and 383 to a common junction 385 and a burner nozzle 368. The gas passage from the low valve 377 is constricted which we have indicated as a smaller diameter conduit 383. We actually prefer to use conduits of similar diameter, but we place a diaphragm in conduit 383 having a small orifice therethrough.

The low valve 377 is actuated by an electro-mechanical means 387 which permits fuel flow to the burner 362 at a low rate.

The high valve 379 is actuated by its electro-mechanical means 389 which then permits a high fuel flow rate regardless of whether the low valve 377 remains actuated. A pilot 374 is also provided.

The operation of the control of FIGURE 5 is analogous to that of FIGURE 3.

Figure 6:
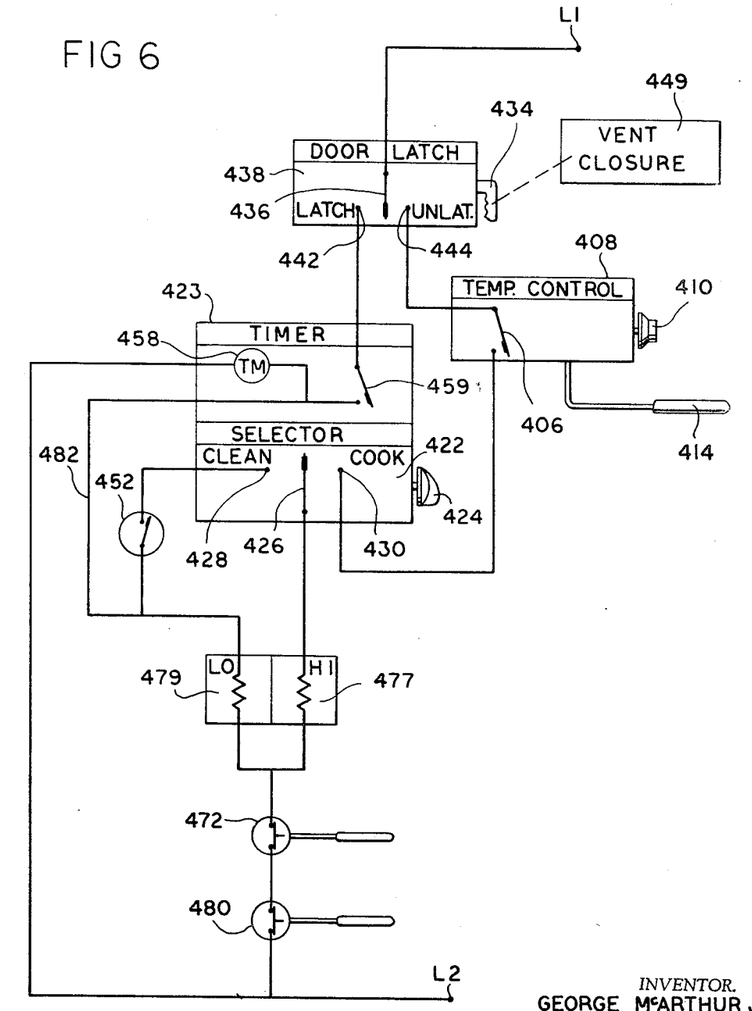
FIGURE 6 is a schematic view of another alternative embodiments of our invention.

In FIGURE 6, we show an embodiment which is new in this continuation in part application. It has basically the same components as those illustrated in FIGURE 5, but these components have been rearranged to permit some circuit simplification. Again, the last two digits of each reference numeral corresponds to components similarly identified in FIGURE 3 and FIGURE 5. Some components should be specifically mentioned because they are not cited elsewhere. A function selector 422 and a timer 423 are provided for the selection and control of the cleaning cycle. A wire 482 connects the timer switch 459 to the low rate control means 479. A timer switch 459 and the cleaning temperature control switch 480 are similar to parts illustrated in FIGURE 7 and explained in connection therewith.

Figure 7:
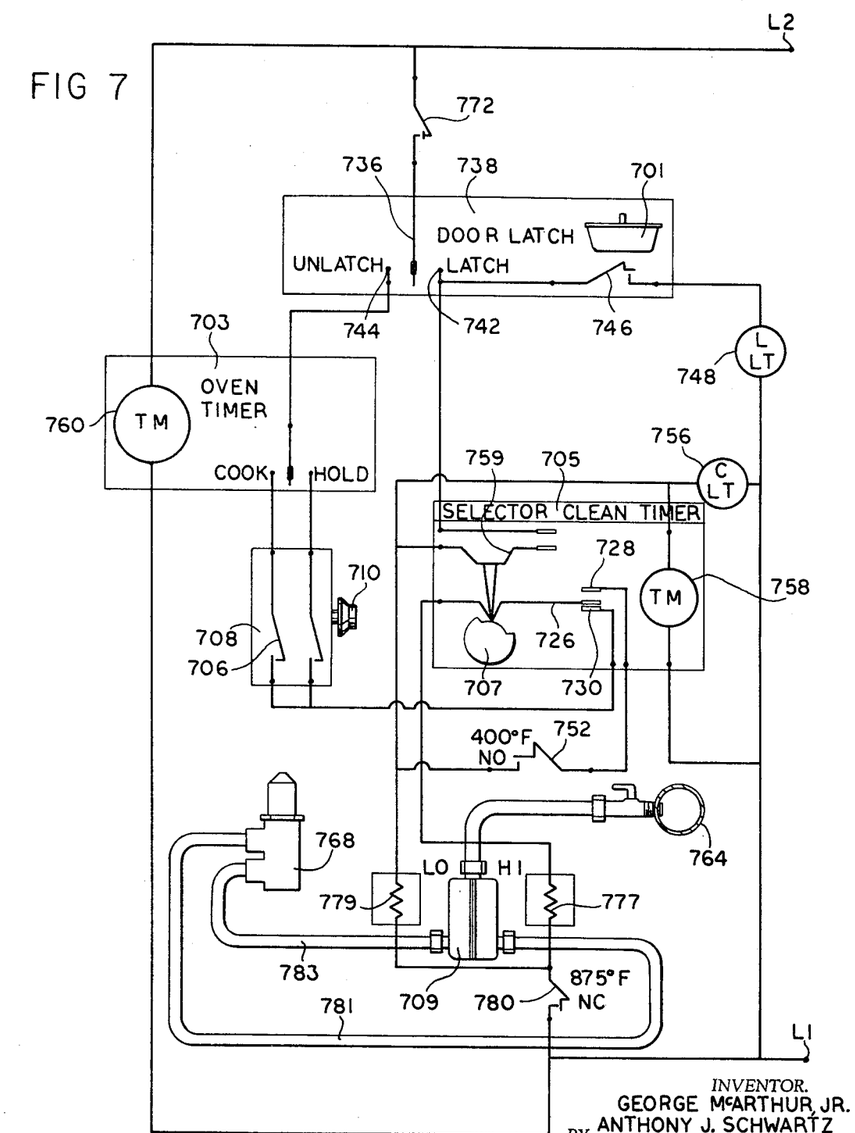
FIGURE 7 is a schematic view of the preferred embodiment of our invention.

The preferred embodiment of our invention is illustrated in FIGURE 7. Again, components which are similar to those in the other figures have the same last two digits.

Generally, the circuit of FIGURE 7 primarily comprises components similar to those in the other circuits. An oven door latch 738 is provided with a single pole double throw switch having a wiper 736 in order to make contact with an unlatch terminal 744 or a latched terminal 742 when the oven door is unlatched or latched. The door latch 738 is also provided with a thermal door lock 701 and a co-operating door lock indicating switch 746 to lock the oven door when the oven temperature rises above a safe limit and to cause the lock indicating light 748 to illuminate when the door is so locked. As described previously in connection with other embodiments, a movable vent closure may be provided with an oven vent of conventional size. The closure would preferably be mechanically linked to a latch handle (not shown in FIG. 7) to partially close the vent when the door is latched.

An oven timer 703 including a timer and clock motor 760 is provided to permit timed cooking. For controlling the oven temperature during cooking, an oven temperature control switch 708 is adjustable by a temperature control knob 710 to a desired temperature and subsequently cycles the burner around the desired temperature.

A function selector and clean timer 705 is provided by which the clean or cook cycle is chosen by an operator and by which the clean cycle is automatically ended after a period of time. The function selector and clean timer 705 has a cam wheel 707 which is connected to a control knob (not illustrated) on the control panel and which is driven by a clean cycle timer motor 758. Two switches, comprising wipers 726 and 759, have cam followers cooperating with the cam wheel 707 so that these switches are actuated thereby. The cam wheel 707 is shown in its cook position. While in this position, the clean timer motor 758 is not energized and therefore does not drive the cam wheel 707. However, when the can wheel 707 is rotated by an operator until the cam followers ride up on the large radius portion of the cam wheel 707, wiper 759 makes a circuit and wiper 726 makes contact with a contact 728. The timer motor 758 is thereby actuated and slowly rotates the cam wheel 707 until it is returned to the cook position.

A low rate control means 779 and a high rate control means 777, when energized, open their respective paths through a control valve 709 and permit gas flow through an orifice fitting 768. A preferred valve 709 and a preferred orifice fitting 768 are described in the copending application of George McArthur, Jr., Ser. No. 770,598. Gas is supplied from a supply line 764.

In the operation of the circuit of FIGURE 7, the cook position is selected by unlatching the door latch 738 so that the wiper 736 contacts terminal 744. The oven timer 703 is positioned at cook or hold, and knob 710 is used to select the cooking temperature. The cam wheel 707 is positioned as illustrated. In this manner, a circuit path is made from a power line L2 through a flame control switch 772, which will be closed if a pilot flame exists, through terminal 744 of the door latch 738, through the temperature control switch 708, through the wiper 726 of the selector and clean timer 705, through the high rate control means 777, through a clean temperature cycling switch 780 to the other power terminal L1. The clean temperature cycling switch is designed to be closed for cooking temperatures. The high rate control valve thus opens to permit gas flow through a pipe 781 to provide cooking heat. The temperature control switch can then open and close in response to the temperature it senses to maintain the desired temperature.

For the cleaning operation, the door latch 738 is latched so that its wiper 736 contacts terminal 742. Thus, the oven timer 703 and the temperature control switch 708 become non-functional parts of the circuit during cleaning. The operator then rotates the cam wheel 707 so that the wipers 759 and 726 make the contacts described above.

During the initial portion of the clean cycle, the low rate control means 779 is alone actuated to provide a low rate of heat delivery. It is actuated by a current path from the power line L2 through the door latch terminal 742, through the wiper 759 of the selector and clean timer 705, through the low rate control means 779, through the clean temperature cycling switch 780 to the other power line L1. Since the clean cycle indicating light 756 and the clean timer motor 758 are connected between the wiper 759 and the line L1, they too will be initially energized.

When the oven temperature reaches a selected temperature, such as 400° F., a selected temperature responsive switch 752 will close. This provides power to the high rate control means 777 by a current path from the wiper 759 of the selector and clean timer 705, through the selected temperature switch 752, through the wiper 726 of the selector and clean timer 705, through the means 777, through the clean temperature cycling switch 780 to the power line L1. At this point, heat is being delivered at a high rate.

When the oven temperature reaches an unsafe limit (e.g. 600° F.), the oven door locks, the lock switch 746 closes, and the lock indicating light 748 is illuminated.

The temperature continues to rise until cleaning temtemperature is reached (e.g. 875° F.). The cleaning temperature cycling switch 780 then opens and closes in response to oven temperature to cycle the oven temperature around the cleaning temperature.

The cycling around cleaning temperature continues until the cam wheel 707 has been driven to its original cook position, at which everything shuts off and the oven temperature falls.

It is to be understood that while the detailed drawings and specific examples given describe preferred embodiments of our invention, they are for the purposes of illustration only, that the apparatus of the invention is not limited to the precise details and conditions disclosed, and that various changes may be made therein without departing from the spirit of the invention which is defined by the following claims.

We claim:
1. An improved method for raising the temperature of an oven to a desired temperature, for use in an oven of the type having a vent, a movable closure for partially obstructing the vent, and a heat supply means, the supply means including at least a gas burner, the supply means having a maximum heat supply rate, wherein the improvement comprises the steps of:
   (a) positioning the closure to partially obstruct the flow through the vent;
   (b) supplying heat into the oven from the supply means at a rate substantially below the maximum heat supply rate of the supply means at least until the oven is sufficiently warm to permit a draft through the oven and the partially obstructed vent adequate to maintain complete combustion of gas delivered to the gas burner at its maximum heat supply rate; and
   (c) thereafter supplying heat into the oven at least partly from the gas burner operating at its maximum heat supply rate until the oven reaches the desired temperature.

2. A control for raising the temperature of an oven having a vent to a desired temperature, the control comprising: means for supplying heat to an oven at a selected low rate; means for supplying heat to an oven at a selected high rate substantially above the selected low rate; means for actuating the low rate supplying means to supply heat to the oven at said low rate; and means for actuating the high rate supplying means to supply heat to the oven at said high rate after the oven approximately reaches a selected temperature, wherein there is provided
   (a) a door latch for latching an oven door;
   (b) a movable vent closure connected for partially obstructing the flow through said vent; and
   (c) means for operating said closure to partially obstruct the flow simultaneously with the latching of the oven door.

3. A control for raising the temperature of an oven having a vent to a desired temperature, the oven being provided with a gas burner and with suitable conduit means supplying gas to the burner, the control comprising means for supplying heat to an oven at a selected low rate; means for supplying heat to an oven at a selected high rate substantially above the selected low rate; means for actuating the low rate supplying means to supply heat to the oven at said low rate; and means for actuating the high rate supplying means to supply heat to the oven at said high rate after the oven approximately reaches a selected temperature, wherein
(a) both of said supplying means comprise valve means, connected to the conduit means, for controlling gas flow rate to the burner, the valve means being positionable to permit a selected high flow rate to the burner and positionable to permit a selected low flow rate to the burner substantially below the high flow rate; and
(b) both of said actuating means comprise means for positioning said valve means to permit the low flow rate, and temperature sensing means for positioning the valve means to permit the high flow rate when the oven reaches a selected temperature.

4. A control according to claim 3,
wherein the valve means is a valve having two positions, one for each of said flow rates, the actuating means includes means for manually actuating the valve to permit said low flow rate, and the temperature sensing means comprises a hydraulic bulb and diaphragm connected to the valve.

5. A control according to claim 3,
wherein the valve means comprises a pair of valves in parallel connection, one of the pair for permitting the low flow rate and the other of the pair for permitting the high flow rate.

6. A control according to claim 3,
wherein the valve means comprises a pair of parallel fuel passages connected from a common fuel source to a burner, a valve in each of said passages, a constriction in one of said passages, and means for operating each valve.

7. A control according to claim 6,
wherein electro-mechanical operating means is provided for each valve;
a first valve is in the passage having a constriction, and has its operating means serially connected to a switch and a source of electrical power; and
the second valve has its operating means serially connected between a temperature responsive switch and a source of electrical power.

8. A control according to claim 7,
wherein a door latch control switch, which makes contact when a door latch is positioned to latch the oven door, is serially connected to said selected temperature sensing means and the operating means of said second valve.

9. A control according to claim 7, wherein
(a) two power input terminals are provided;
(b) a thermostat cycling switch has a first terminal connected to a first one of the power input terminals;
(c) a selector switch is provided having an input terminal connected to a second terminal of said cycling switch and having a pair of output terminals, one for clean and the other for cook;
(d) a thermostate function switch is provided, mechanically connected for operation with an oven temperature control knob, having a pair of terminals which are connected when the temperature control knob is adjusted for maximum temperature, and having a first of its terminals connected to the clean terminal of said selector switch;
(e) the operating means for the first valve is connected between a second terminal of said thermostat function switch and the second power input terminal;
(f) a door latch control switch connected to a door latch is provided which makes contact when the latch is positioned to latch an oven door;
(g) said temperature sensing means is a temperature responsive single pole switch connected between the second terminal of the thermostat function switch and the door latch control switch; and
(h) the means for operating the second valve is connected between the latch control switch and the second power input terminal.

10. A control according to claim 9,
wherein a clean period timing means is provided which comprises a clock electrically connected between the door latch control switch and the second power input terminal and a cam mounted for rotation with said clock and co-operating with a cam follower linked to said selector switch for disconnecting the input and clean terminals of the selector switch a selected time period after closing of said temperature sensing means.

11. A control according to claim 6,
wherein there is serially connected to the operating means of the first valve
(a) a selector switch having an input terminal and two output terminals, one for clean and one for cook; and
(b) a thermostate function switch having a pair of contacts, mechanically connected to an oven temperature control knob for operation thereby, for making contact when the temperature control knob is set for maximum temperature.

12. A control according to claim 11,
wherein a thermostat cycling switch is electrically connected to the operating means of the first valve.

13. A control according to claim 11,
wherein means for timing the cleaning period is provided for breaking the circuit through the selector switch after a selected cleaning period.

14. A control according to claim 11,
wherein the cleaning period timing means comprises a clock having a cam co-operating with a cam follower linked to the selector swtich.

15. A control for raising the temperature of an oven to a desired temperature, the oven being provided with a vent, a gas burner, and suitable conduits supplying gas to the burner, the control comprising:
(a) an electric heater thermally connected for delivery of heat into the oven;
(b) a valve connected to the conduits to permit flow of gas to the burner;
(c) actuating means for energizing the electric heater; and
(d) temperature sensing means for actuating the valve when the oven reaches a selected temperature.

16. A control according to claim 15,
wherein there is serially connected to the electric heater
(a) a selector switch having an input terminal and two output terminals, one for clean and one for cook; and
(b) a thermostat function switch having a pair of contacts, mechanically connected to an oven temperature control knob for operation thereby, for making contact when the temperature control knob is set for maximum temperature.

17. A control according to claim 15, wherein
(a) two power input terminals are provided;
(b) a thermostat cycling switch has a first terminal connected to a first one of the power input terminals;
(c) a selector switch is provided having an input terminal connected to a second terminal of said cycling switch and having a pair of output terminals, one for clean and the other for cook;
(d) a thermostat function switch is provided, mechanically connected for operation with an oven temperature control knob, having a pair of terminals which are connected when the temperature control knob is adjusted for maximum temperature, and having a first of its terminals connected to the clean terminal of said selector switch;
(e) the electric heater is connected between a second terminal of said thermostat function switch and the second power input terminal;
(f) a door latch control switch connected to a door latch is provided, having a wiper terminal and a wiper connected thereto, and a pair of other co-operating terminals including a latch terminal, connected to the wiper terminal when the latch is positioned to latch an oven door, and an unlatch terminal connected to the wiper terminal when the latch is positioned to not latch the oven door, the unlatch terminal being connected to the cook terminal of said selector switch;

(g) said temperature sensing means is a temperature responsive single pole switch connected between the second terminal of the thermostat function switch and the latch terminal of the door latch control switch; and (h) an electro-mechanical means for operating said valve is connected between the wiper terminal of the latch control switch and the second power input terminal.

18. A control according to claim 17,
wherein a clean period timing means is provided which comprises a clock electrically connected between the latch terminal of the door latch control switch and the second power input terminal and a cam mounted for rotation with said clock and co-operating with a cam follower linked to said selector switch for disconnecting the input and clean terminals of the selector switch a selected time period after closing of said temperature sensing means.

19. A control according to claim 3, comprising
(a) two power input terminals;
(b) a single pole double throw door latch switch having its wiper terminal connected to a first power input terminal and having an unlatch terminal and a latch terminal alternatively contactable by the wiper;
(c) a single pole single throw thermostat cycling switch having a first terminal electrically connected to the unlatch terminal of said door latch switch;
(d) a single pole double throw selector switch having a wiper terminal, a cook terminal, and a clean terminal, and having its cook terminal electrically connected to the second terminal of the thermostat cycling switch;
(e) heat actuating means electrically connected between the wiper terminal of the selector switch and the second power input terminal;
(f) a timer comprising a timer motor and a single pole single throw timer switch, the timer switch having a first terminal connected to the latch terminal of the latch switch and the timer motor connected between the second terminal of the timer switch and the second power input terminal;
(g) means for linking the timer to the selector switch for closing the timer switch when the selector switch wiper is moved into contact with its clean terminal and for opening the timer switch and moving the selector switch wiper into contact with its cook terminal after the timer motor has operated for a selected time period;
(h) said low heat actuating means, electrically connected between the second terminal of the timer switch and the second power input terminal; and
(i) a single pole single throw selected temperature responsive switch, for making a circuit when the oven temperature reaches a selected temperature, electrically connected between the clean terminal of the selector switch and the second terminal of the timer switch.

20. A control according to claim 19,
wherein a single pole single throw cleaning temperature control switch is interposed between the high heat actuating means and the second power input terminal, for cycling the high heat actuating means around a selected cleaning temperature.

21. A control according to claim 19,
wherein the cleaning temperature control switch is also interposed between the low rate actuating means and the second power input terminal.

22. A control for raising the temperature of an oven having a vent to a desired temperature, the oven being provided with a gas burner and with suitable conduit means supplying gas to the burner, the control comprising:

(a) means for supplying heat to an oven at a selected low rate;
(b) means for supplying heat to an oven at a selected high rate substantially above the selected low rate;
(c) means for actuating the low rate supplying means to supply heat to the oven at said low rate; and
(d) means for actuating the high rate supplying means to supply heat to the oven at said high rate after the oven approximately reaches a selected temperature; wherein:
(a) both of said supplying means together comprise
(1) a pair of conduits connecting the gas supply conduit means to the gas burner; and
(2) a pair of valves, one in each of said pair of conduits, for controlling the gas flow therethrough; and
(b) both of said actuating means comprise:
(1) a pair of electro-mechanical valve actuating means, one for actuating each of said valves, each having two control terminals; having a first terminal of each connected to a first terminal (L1) of an electrical power source;
(2) a single pole single throw first switch (759) having a first terminal electrically connected to a second terminal (L2) of an electrical power source and having its second terminal electrically connected to a second terminal of one of said valve actuating means (779);
(3) a single pole double throw second switch (726) having its wiper electrically connected to a second terminal of the other of said valve actuating means (777); and
(4) a normally open temperature sensing switch electrically connected between a first terminal (728) of said second switch and said second terminal (759) of said first switch.

23. A control according to claim 22,
wherein a cooking temperature control switch (708) is electrically connectible between said second terminal (L2) of said electrical power source and a second terminal (730) of said second switch (726).

24. A control according to claim 23,
wherein a single pole double throw door latch (738) switch has a wiper (736) electrically connected to said second terminal (L2) of said electrical power source, has a first terminal (742) electrically connected to the first terminal of said first switch (759) and, through said wiper (736) of said latch switch, connecting the first terminal of said first switch to the second terminal of said electrical power source, and has a second terminal (744) connected to said cooking temperature control switch (703).

25. A control according to claim 22,
wherein both said first switch (759) and said second switch (726) are operable by a cam wheel and cam follower.

26. A control according to claim 25,
wherein a timer motor is electrically connected between said first terminal (L1) of said electrical power source and the second terminal (759) of said first switch and
wherein said timer motor is mechanically connected to drive said cam wheel in rotation.

27. A control according to claim 7
wherein the temperature responsive switch comprises a bi-metallic switch which makes contact when heated to a selected temperature.

28. A control according to claim 7 wherein the temperature responsive switch comprises a single pole switch operated by a hydraulic bulb and diaphragm system.

29. A control according to claim 7 wherein the temperature responsive switch comprises a mercury switch.

30. A control according to claim 15, wherein there is provided
(a) a door latch for latching an oven door;
(b) a vent closure connected for obstructing the flow through said vent; and
(c) means for operating said closure for obstructing the flow simultaneously with the latching of the oven door.

31. A control according to claim 15, wherein
(a) said actuating means comprises a single pole actuating switch serially connected between the electric heater and a source of electrical power;
(b) electro-mechanical means is provided for operating the valve; and
(c) the temperature sensing means comprises a temperature responsive single pole switch in series connection with the electro-mechanical means and the actuating switch.

32. A control according to claim 31, wherein the temperature responsive switch comprises a bi-metallic switch which makes contact when heated to a selected temperature.

33. A control according to claim 16, wherein a thermostat cycling switch is serially connected to the electric heater.

34. A control according to claim 16, wherein means for timing the cleaning period is provided for breaking the circuit through the selector switch after a selected cleaning period.

35. A control according to claim 34, wherein the cleaning period timing means comprises a clock having a cam co-operating with a cam follower linked to the selector switch.

36. A control according to claim 16, wherein there is serially connected in parallel relation to the electric heater:
(a) said selected temperature sensing means; and
(b) electro-mechanical means for operating said valve.

37. A control according to claim 36, wherein a door latch control switch, which makes contact when a door latch is positioned to latch the oven door, is serially connected to said selected temperature sensing means and said valve operating means.

38. A control according to claim 37, wherein
(a) the door latch control switch has a wiper and a wiper terminal connected thereto and two other terminals co-operating with said wiper;
(b) the wiper terminal is connected to the valve operating means;
(c) a first of said other terminals is connected to said selected temperature sensing means; and
(d) a second of said other terminals is connected to an output terminal of said selector switch.

References Cited

UNITED STATES PATENTS

| | | | |
|---|---|---|---|
| 2,509,679 | 5/1950 | Evans | 126—39 |
| 3,364,912 | 1/1968 | Dills et al. | 126—21 |

EDWARD G. FAVORS, Primary Examiner

U.S. Cl. X.R.

236—15